United States Patent [19]

Wolf

[11] 4,180,036
[45] Dec. 25, 1979

[54] FUEL TEMPERATURE CONTROL

[76] Inventor: Gil Wolf, 7412 Laramie, Skokie, Ill. 60076

[21] Appl. No.: 871,242

[22] Filed: Jan. 23, 1978

[51] Int. Cl.² .............................................. F02M 31/00
[52] U.S. Cl. ................................ 123/122 E; 123/133; 123/122 F
[58] Field of Search ................ 123/122 E, 133, 34 A, 123/122 H; 165/52, 51; 261/142, 144, 145

[56] References Cited

U.S. PATENT DOCUMENTS

| | | | |
|---|---|---|---|
| 1,240,372 | 9/1917 | Rodgers | 165/52 |
| 1,248,954 | 12/1917 | Troher | 165/52 |
| 1,271,357 | 7/1918 | Perkins | 165/52 |
| 1,319,718 | 10/1919 | Martin | 123/122 H |
| 2,884,917 | 5/1959 | Quinby | 123/133 |
| 3,957,024 | 5/1976 | Mills | 123/122E |
| 3,986,486 | 10/1976 | Rabbioi | 123/122 E |
| 3,989,019 | 11/1976 | Brendt | 123/122 E |

*Primary Examiner*—Ronald H. Lazarus
*Attorney, Agent, or Firm*—Norman Lettvin; Marvin S. Siskind

[57] ABSTRACT

An improved system for controlling the temperature of fuel entering an engine, the system including a heat exchanger interposed between a fuel supply and the engine for preheating the fuel. The heat exchanger is formed by an exterior, fluid-tight casing having a plurality of fluid-tight tubes housed therein to isolate fluid passing through the tubes from the remainder of the interior of the casing so as to provide two flow paths, one through the tubes, and the other through the remainder of the casing, and having fuel and engine-coolant fluid, inlet and outlet ports. The improvement including an engine-coolant fluid flow control valve positioned adjacent the fuel inlet port, a fuel temperature sensor positioned adjacent the fuel outlet port and a fluid valve-actuating relay operative to receive fuel temperature information from the temperature sensor and control the fluid flow valve. When the fuel temperature exceeds a predetermined value, the relay is energized to close the fluid flow valve, thereby terminating the flow of engine-coolant fluid and preventing undesirable, excessive temperatures of the heated fuel. Operatively housed within the heat exchanger is an energizable heater element, which preheats the fuel flowing through the heat exchanger casing at such times that the temperature of the engine-coolant fluid is insufficient to warm the fuel.

3 Claims, 2 Drawing Figures

FUEL TEMPERATURE CONTROL

FIELD OF THE INVENTION

This invention relates to a system for preheating fuel prior to its entry into an internal combustion engine, and more particularly, to an improved preheating system that includes a heat exchanger for controlling the temperature of fuel introduced into an internal combustion engine.

BACKGROUND OF THE INVENTION

It is well known that Diesel internal combustion engines and particularly Diesel truck engines obtain optimum performance and efficiency when using #2 Diesel fuel. However, in cold weather conditions, such fuel becomes extremely viscous and as temperatures fall into sub-zero ranges, the #2 fuel can actually become too thick to pass through fuel filters. Even if the fuel is able to flow through the filter to the engine, it may be too cold to ignite. And even if ignition does result, performance and efficiency suffer.

Previous attempts were made to solve the problem by blending the #2 Diesel fuel with the less viscous #1 Diesel fuel. The mixture of fuels aided cold weather ignition, but power was reduced, performance suffered, engine life was shortened because the advantageous lubrication qualities of pure #2 fuel were lost, gas mileage dwindled because of the lower B.T.U. content of #1 fuel, and it was still impossible to maintain the engine idle speed at very low outside temperatures.

A successful solution to some of the cold weather Diesel engine starting problems exhibited with pure #2 fuel or with The #1 and #2 fuel mixture was enunciated in U.S. Pat. No. 3,929,187. Therein a heat exchanger was mounted on an internal combustion engine for preheating low temperature, highly viscous fuels prior to burning in the engine. Such exchangers reduced the viscosity of the fuel, eliminated fuel filter clogging, allowed the use of pure #2 Diesel fuel, and improved fuel burning efficiency.

Heat exchangers for preheating fuel and particularly Diesel fuel are now commonly employed in commercial Diesel truck engines. Some of these heat exchangers are warmed by exhaust pipe gases, but the far more prevalent and efficient systems transfer heat in the exchangers to warm fuel passing therethrough by using the engine-coolant fluid from the radiator and engine block. As the engine ignites and continues to run, temperatures in the engine compartment warm the coolant which, in turn, is used to preheat the fuel. However, there exists a point wherein the coolant from the very hot engine warms the fuel to a temperature in excess of a critical value. That value is determined as the temperature at which the heated fuel will scorch parts of the fuel injection assembly and normally occurs at approximately 180° F.

It is therefore one object of the present invention to provide a system for controlling the temperature of fuel flowing into an internal combustion engine by sensing the temperature of the fuel approximate the outlet port of the heat exchanger and preventing the inflow of hot coolant when the temperature rises above the predetermined critical value.

While previous heat exchangers helped to maintain the operational efficiency of Diesel engines burning #2 Diesel fuel, despite frigid outside temperature conditions, they did not aid the initial ignition of the fuel in the cold engine. When the engine is started in zero degree temperatures, after a prolonged period of non-use, the coolant is just as cold as the fuel. Consequently, the coolant cannot effectively transfer heat to the fuel flowing through the heat exchanger.

It is yet a further object of the present invention to provide a heat exchanger for warming internal combustion engine fuels at times that the engine, fuel and coolant are as cold as the outdoor temperature, the exchanger including an additional heating element connected to an external power supply.

These and other objects and advantages of the invention will become clear from the following description of a preferred embodiment of the invention.

BRIEF SUMMARY OF THE INVENTION

The invention utilizes an improved preheating system as part of the delivery of fuel to an internal combustion engine. A heat exchanger having a fluid-tight casing is provided with fuel, an engine-coolant fluid, inlet and outlet ports and a plurality of fluid-tight tubes housed within the casing to isolate fluid passing through the tubes from the remainder of the interior of the casing so as to establish two fluid flow paths, one through the tubes and one through the remainder of the casing. The engine-coolant fluid may be conducted through the fluid ports to transfer heat to the fuel flowing through the casing between the fuel ports. A sensor is provided to measure the temperature of the fuel adjacent the fuel outlet port and cooperates with a valve to control engine-coolant fluid flow into the casing, whereby fluid flow may be terminated when the fuel temperature exceeds a predetermined value. The exchanger includes a selectively energizable heating element operably positioned within the casing to heat the fuel flowing therethrough, the energizable heating element connected to an external power supply, whereby the fuel may be heated at such times that the temperature of the engine-coolant fluid is insufficient to accomplish a fuel warming action.

DETAILED DESCRIPTION OF THE DRAWINGS

Figure 1:
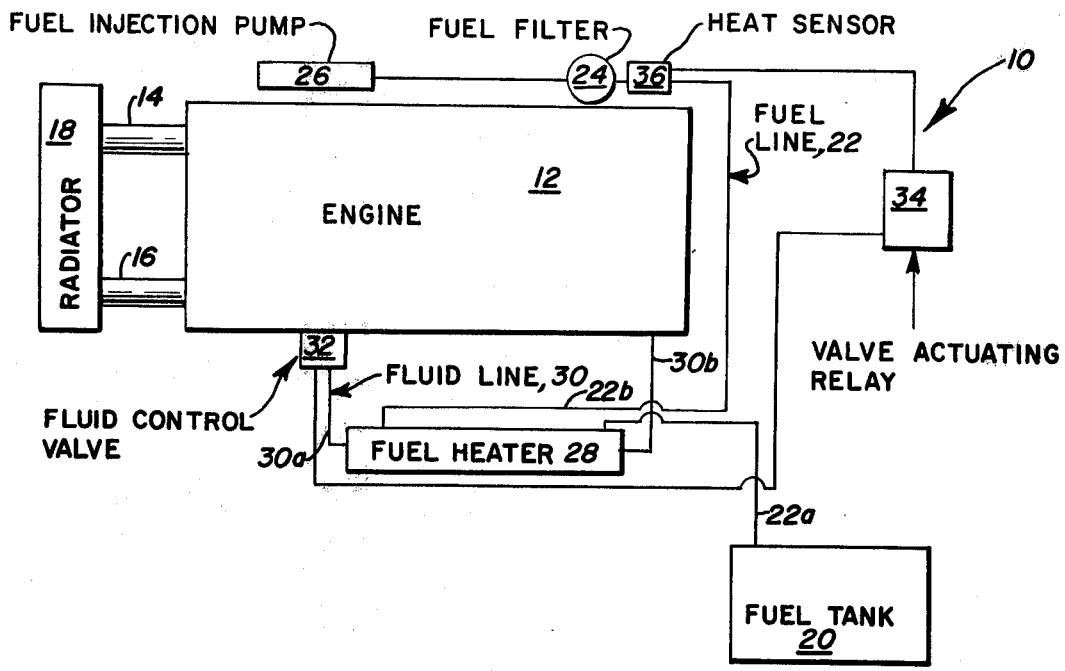
FIG. 1 is a schematic layout of the fuel preheating system of this invention and showing the flow paths of the fuel and engine-coolant fluid to the engine block.

Referring now to the drawings, the improved fuel preheating system of this invention is shown generally at 10. The preheating system is used in combination with an internal combustion engine schematically illustrated as 12 in FIG. 1. Although this application deals primarily with Diesel engines and Diesel fuels for burning therein, it should be understood that the basic concept is applicable to internal, external, jet, steam or Sirling engines wherein beneficial results may be obtained by injecting warmed fuel for ignition.

THE FUEL PREHEATING SYSTEM

The engine 12 is connected by inflow and outflow hoses, 14 and 16 respectively, to a radiator 18 (or other means of cooling the engine-coolant fluid) containing engine-coolant fluid. The radiator 18 circulates the fluid, usually a water and antifreeze mixture, via the hoses 14 and 16 to the internal combustion engine 12 for controlling the operating temperature of the engine 12. Because of the continual ignition of fuel within the engine and the frictional movement of the engine valves, shafts, cylinders, etc., the engine normally operates at very high temperatures. If no engine-coolant fluids, such as the radiator fluid, were used to dissipate heat, the engine 12 would "freeze-up". Consequently, the fluid circulates through the engine 12 wherein it captures a portion of the built-up engine heat and returns to the finned radiator for cooling before recycling through the engine.

In the normal Diesel internal combustion engine, the fuel is stored in a fuel tank 20 for delivery through a fuel line 22 to a fuel filter 24 before injection by a fuel injection pump 26 into the ignition chamber of the engine 12. It is common practice to position fuel warmers in the form of heat exchangers, such as 28, along fuel line 22 for preheating the fuel prior to injection into the engine. In order to accommodate the heat exchanger 28, the fuel line 22 is divided in a line 22a upstream of the exchanger and a line 22b downstream of the exchanger.

In order to warm the fuel, it is necessary that enginecoolant fluid be guided through the heat exchanger 28. To this end the fluid from the engine 12 follows a fluid line 30, divided into a line 30a upstream of the exchanger and a line 30b downstream of the exchanger. The fluid reenters the engine from line 30b and then returns to the radiator 18 for cooling and recycling.

It is one purpose of the present invention to prevent the flow of the heating fluid through the heat exchanger 28 when the temperature of the fuel exiting from the exchanger 28 exceeds a predetermined critical value, i.e., approximately 180° F., or that value at which hot fuel begins to scorch parts of the injection assembly. To this end a solenoid valve 32, for controlling the flow of the engine-coolant fluid from the engine 12 into the heat exchanger 28, is positioned adjacent the upstream side of the exchanger 28 and operatively connected to the fluid line 30a. The line 30b returns the fluid from the downstream side of the exchanger 28 to the engine 12. The fluid control valve 32 is connected to a valve actuating relay 34 (electrical or mechanical) which, in turn, is connected to a heat sensing switch 36. The sensor 36 is positioned adjacent to and on the downstream side of the exchanger 28 for measuring the temperature of the fuel exiting from the exchanger 28. The heat sensor 36 is preferably a snap-action switch which opens or closes when the fuel is preheated to the predetermined, critical temperature. The action of the switch snapping shut or opening actuates the relay 34, which, in turn, closes the solenoid valve 32 to terminate the flow of engine-coolant fluid into the exchanger 28.

THE HEAT EXCHANGER 28

Figure 2:
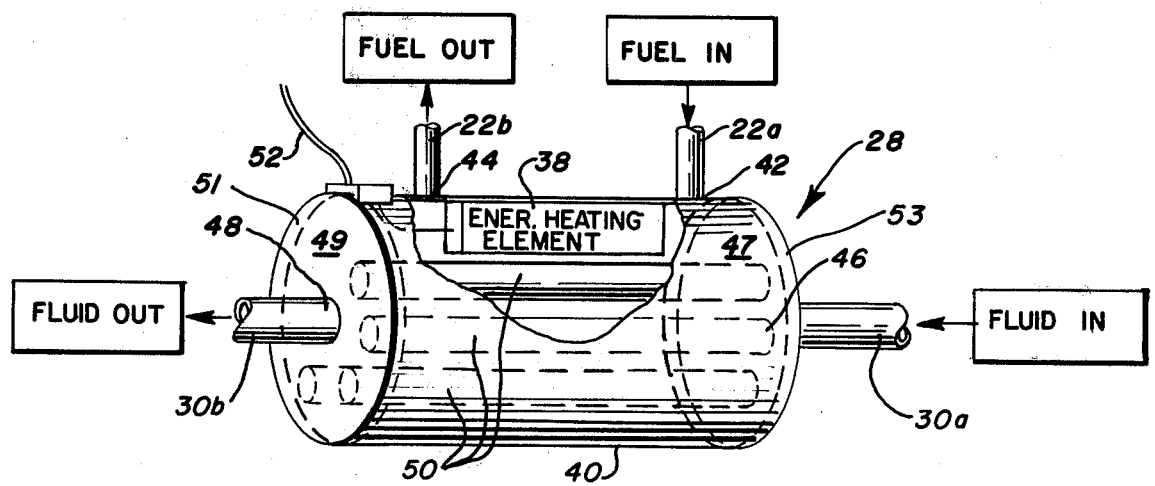
FIG. 2 is a perspective view, partially broken away, of one type of well known heat exchanger and showing the relationship of the energizable heating element of the present invention to the fuel and fluid flow paths through the heat exchanger.

The heat exchanger 28 may take any well-known form as long as sufficient interior space is provided for the attachment of an energizable heater means 38 in heat transfer relation to fluid flowing through the exchanger 28. As depicted in FIG. 2, the exchanger 28 includes an external, fluid-tight casing 40 bounded by end walls 47 and 49, the casing 40 having an external fuel inlet port 42, an external fuel outlet port 48, and a plurality of spaced, fluid-tight tubes 50 housed within the casing 40. The tubes 50 are in fluid communication with oppositely disposed headers 51 and 53 formed interiorly of the end walls 47 and 49 and which allow fluid to flow from the inlet and outlet ports 46 and 48 through the tubes 50, in isolation from the interior of the exchanger casing 40 so as to provide two flow paths, one through the fluid-tight tubes 50, and the other through the remainder of the interior of the casing.

Although the fuel ports 42 and 44 are shown positioned atop the casing 40 and fluid ports 46 and 48 are shown positioned at opposite side walls, it is to be understood that all ports may be placed at any position on the casing, as long as one fluid is able to feed through the tubes 50 in the first flow path, and the other fluid is able to flow past those tubes 50 in the other flow path.

Prior art fuel exchangers are of two wellknown types. One type is exemplified by FIG. 2 which shows the engine-coolant fluid flowing through the tubes 50, while the fuel flows through the remainder of the interior of the casing 40. This type of heat exchanger is shown in an advertising publication of Phillips, Minneapolis, Minn. In the second well-known type, the fuel flows through the tubes 50, while the fluid flows through the casing 40 (see U.S. Pat. No. 3,929,187). In the event that the flow paths are reversed, as in the second type of exchanger, the energizable heating element 38 may be: (1) maintained in the same heat transfer position wherein it would heat the engine-coolant fluid to indirectly heat the fuel; (2) positioned to closely overlie the tubes 50 wherein it would heat both the fuel and the fluid; or (3) positioned within the tubes 50 to directly heat the fuel.

The energizable heater element 38 preferably takes the form of a plurality of electrically warmed coils, heated by an external source of power connected to the element 38 by an electrical cord 52. Other mechanical or chemical sources of heat may be substituted for the electrical source just described without departing from the spirit or scope of the invention. It is only necessary that the heating element be positioned within the casing 40 of the heat exchanger 28 in heat transfer relationship, such that the fuel is able to flow therepast and absorb heat therefrom.

While the improved fuel preheating assembly, including the fluid control valve 32, the valve actuating relay 34 and the heat sensor 36, has been shown and described as positioned externally of the heat exchanger, it is within the ambit of the present invention that the valve 32, the relay 34 and the sensor 36 be connected, either internally or externally, to the exchanger 28 for sale and installation as a unit.

OPERATION

In very cold weather the electrical cord 52 of the energizable heater element 38 of heat exchanger 28 is plugged into an external source of electrical power. As the ignition is switched on, the fuel flows from the fuel tank 20, along fuel line 22a into the inlet port 42 of the exchanger 28, wherein preheating occurs as the fuel is directed past the additional heating element 38. Of course, the engine-coolant fluid is simultaneously pumped through the fuel exchanger tubes 50, but because the engine had just been started, the fluid is as cold as the outdoor temperature and is unable to transfer any heat to the fuel.

The fuel, warmed by the energizable heater element 38, ignites easily and the engine begins to run. After running for a short while, the heat built up in the engine 12 is transferred to the engine-coolant fluid flowing from the radiator 18 through the engine block. Now that the fluid is warm, it is able to preheat the fuel in the heat exchanger 28 and the energizable heater element 38 is disconnected.

The fluid continues to heat the fuel as both circulate through the exchanger 28. However, the fluid, itself, is being heated to continually higher temperatures as the engine operating temperature rises. If the fluid, at this temperature, was permitted to flow through the exchanger 28, the fuel would become heated to a temperature in excess of 180° F., the temperature at which the fuel injection pump 26 becomes scorched. However, the heat sensor 36 senses the fuel temperature at the outlet of the fuel exchanger 28 and operates the valve actuating relay 34 to activate solenoid valve 32 for terminating the flow of fluid from the engine 12. In this manner the temperature of the fuel is maintained below the critical 180° F. temperature. When the fuel temperature drops below the critical range, the solenoid valve may again be opened, thereby maintaining the fuel at a warm but not "hot" temperature.

While one form of the invention has been described, it will be understood that the invention may be utilized in other forms and environments, so that the purpose of the appended claims is to cover all such forms of devices not disclosed but which embody the invention disclosed herein.

What I claim is:

1. In a preheating system for liquid diesel fuel being used in a diesel engine, such as for use in an automotive vehicle equipped with a liquid cooled engine and having radiator means for dissipating excess engine heat from the heated liquid coolant, wherein the preheating system includes heat exchanger means for transferring heat from liquid coolant to diesel fuel that is being acted upon by a pump for effecting pressurized injection of liquid diesel fuel through injector means into the engine;

the improvement comprising, in combination:

a heat exchanger means including a liquid tight casing enclosing and partially bounding a flow space for diesel fuel, heat transfer tube means occupying a portion of the entire space enclosed by the casing and for carrying therethrough liquid coolant after the engine has been started and is running, and a selectively energizable auxiliary heating element positioned in said flow space for the diesel fuel;

means including a pump downstream of the heat exchanger means for causing diesel fuel to move only through said flow space that is exterior of said heat transfer tube means in the casing, so that the diesel fuel will contact, in direct heat transfer relation, the auxiliary heating element to preheat the fuel at such times when the temperature of the engine coolant liquid is insufficient to preheat the fuel, thereby permitting said pump to supply preheated liquid diesel fuel to the engine to permit engine start-up at very low temperatures;

flow line means arranged for directing heated liquid coolant from the engine through the heat transfer tube means of the heat exchanger means after the engine has been started and after the selectively energizable heating element has been de-energized;

temperature sensing means for sensing the temperature of heated liquid diesel fuel being delivered downstream of the heat exchanger means to said downstream pump for injecting heated diesel fuel into the engine;

shut-off valve means operatively controlled by said temperature sensing means for either permitting, or shutting off, flow of liquid coolant from the engine to said heat transfer tube means; and said temperature sensing means being operative to limit heating of the diesel fuel by heat transferred from said heated liquid coolant when the temperature of the heated liquid diesel fuel sensed exceeds about 180° F., so as to prevent scorching of the fuel injector means by heated liquid diesel fuel.

2. A preheating system as in claim 1 wherein the heated liquid coolant is taken directly from the engine to said heat transfer tube means to maximize the temperature at which heat is transferred to said liquid diesel fuel.

3. A preheating system as in claim 2 wherein the heated liquid coolant is returned directly from said heat transfer tube means to the engine.

* * * * *